(12) United States Patent
Ori

(10) Patent No.: US 8,894,123 B1
(45) Date of Patent: Nov. 25, 2014

(54) PANEL RACK FOR PICK-UP TRUCKS

(76) Inventor: James C. Ori, Cave Creek, AZ (US)

( * ) Notice: Subject to any disclaimer, the term of this patent is extended or adjusted under 35 U.S.C. 154(b) by 4 days.

(21) Appl. No.: 13/365,536

(22) Filed: Feb. 3, 2012

Related U.S. Application Data

(60) Provisional application No. 61/463,871, filed on Feb. 25, 2011.

(51) Int. Cl.
*B60P 7/15* (2006.01)

(52) U.S. Cl.
USPC ........................................ 296/26.11; 296/57.1

(58) Field of Classification Search
CPC ........ B60P 7/14; B62D 33/0273; B62D 33/08
USPC ........................ 296/26.11, 26.03, 57.1, 26.02
See application file for complete search history.

(56) References Cited

U.S. PATENT DOCUMENTS

| | | | | |
|---|---|---|---|---|
| 4,236,854 A | * | 12/1980 | Rogers | ........................... 410/121 |
| 4,951,991 A | * | 8/1990 | Haigler | ...................... 296/26.09 |
| 5,526,972 A | | 6/1996 | Frazier et al. | |
| 5,584,524 A | | 12/1996 | Vogel | |
| 6,267,427 B1 | | 7/2001 | Zichl | |
| 7,182,380 B2 | * | 2/2007 | Nagle | ........................ 296/26.11 |
| 8,146,786 B2 | * | 4/2012 | Cheung et al. | ................ 224/403 |
| 8,162,574 B2 | * | 4/2012 | Keramidis | ...................... 410/38 |

* cited by examiner

*Primary Examiner* — Glenn Dayoan
*Assistant Examiner* — Melissa A Black
(74) *Attorney, Agent, or Firm* — Harpman & Harpman

(57) ABSTRACT

A pick-up truck cargo bed material transport support system for the transportation of large panel material and the like within the cargo bed of a pick-up truck. An adjustable support rack is removably positioned within the cargo bed of a pick-up truck rearwardly of the rear wheel wells having multiple pivoted linkage arm support assembly extending onto the lowered tailgate of the cargo bed when in use. The support rack is collapsible when not in deployed use and combined with a secondary cross bed support beam positioned forward of the rear wheel wells provides a unique support material engagement system within the cargo bed for large panel-like or associated loads.

5 Claims, 3 Drawing Sheets

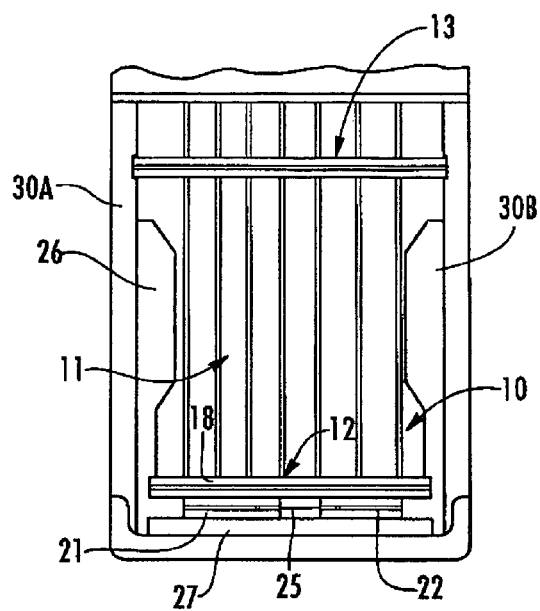
FIG. 6
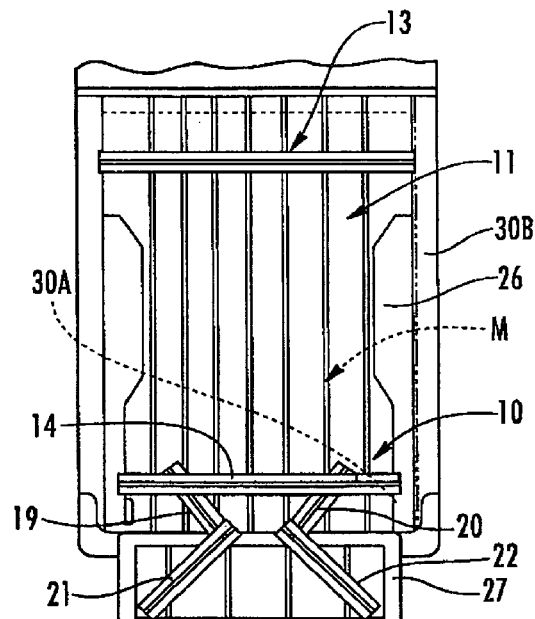
FIG. 7
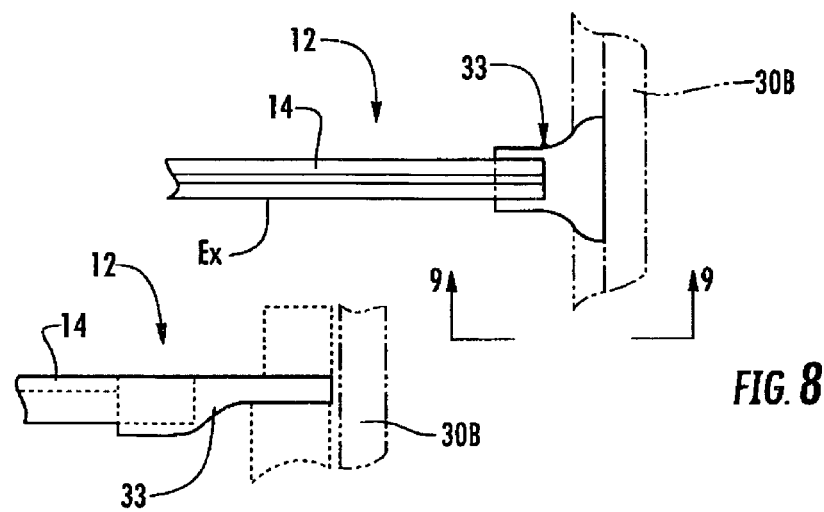
FIG. 8
FIG. 9

PANEL RACK FOR PICK-UP TRUCKS

This application claims the benefit of U.S. Provisional Patent Application Ser. No. 61/463,871, filed Feb. 25, 2011.

BACKGROUND OF THE INVENTION

1. Technical Field

This invention is directed to inserts for cargo beds of a pick-up truck to provide different material support and positioning of cargo within the cargo bed.

2. Description of Prior Art

Prior art devices of this type have been directed to a variety of cargo bed inserts designed to hold and support cargo therewithin. Examples of same include cargo bed liners that have molded support receiving rests and the following U.S. Pat. Nos. 5,526,972, 5,584,524 and 6,267,427.

In U.S. Pat. No. 5,526,972 a space organizer for truck beds can be seen having a multiple partitioned storage system.

U.S. Pat. No. 5,584,524 is directed to a liner for a truck bed for the loading and unloading of objects positioned therewithin.

U.S. Pat. No. 6,267,427 claims a truck bed divider assembly having a cargo bed insert to organize the bed by positioning in to separate compartments for cargo.

Cargo support enabling devices in this venue typically rely on the use of simple cross beams being positioned above the rear wheel wells usually enabled by bed liners that have support pockets molded within or cargo bed sidewalls having integrated fittings for cargo support rails.

SUMMARY OF THE INVENTION

This invention relates to pick-up truck cargo bed storage systems that use insert elements to address the problems associated with the transportation of large sheet-like material in the limited space available in the cargo bed due to bed size and/or wheel well incursion. A material support bed insert having an expandable support bracket for selective engagement on the lower tailgate of a truck imparting a balanced elevated material support surface therewithin.

DESCRIPTION OF THE DRAWINGS

FIG. 6 is a top plan graphic view of the material support device in collapsed position in a cargo bed.

FIG. 7 is a top plan graphic view of the material support device in an expanded deployed position in a cargo bed.

FIG. 8 is an enlarged partial top plan view of an alternate mounting fixture rail adaption for size.

FIG. 9 is a front elevational view thereof.

DETAILED DESCRIPTION OF THE INVENTION

Figure 1:
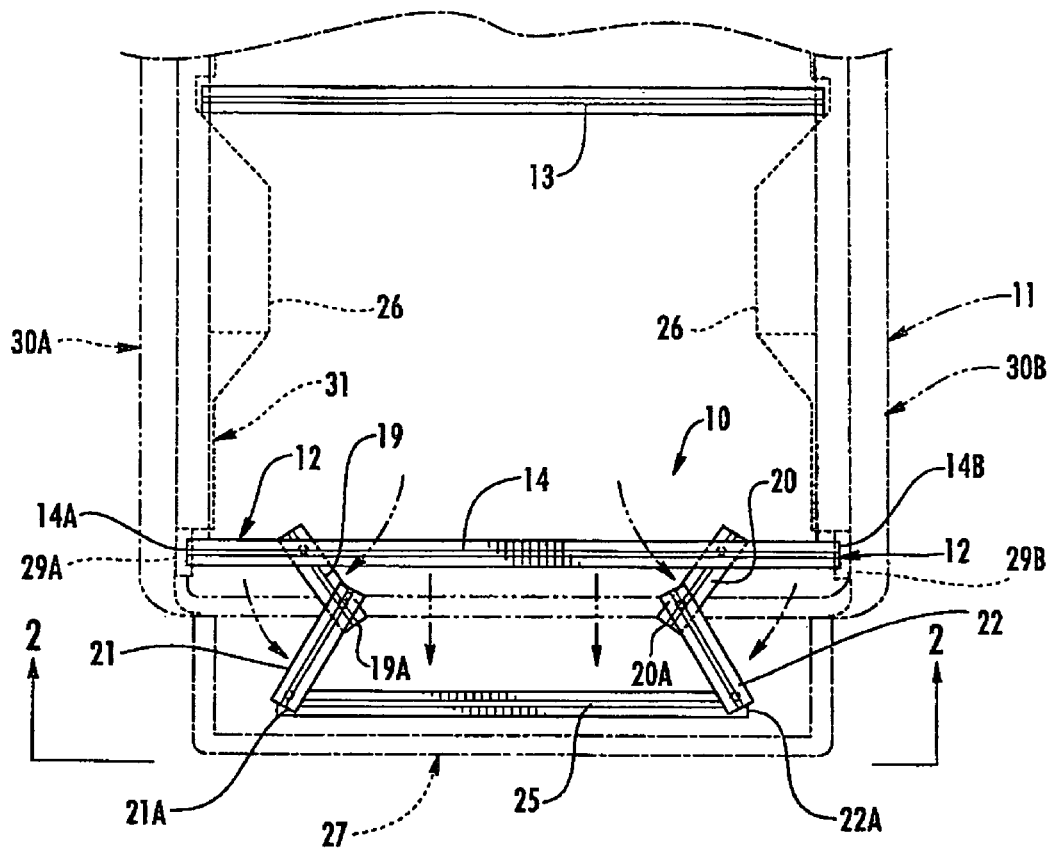
FIG. 1 is a top plan view of the material support of the invention in a cargo bed shown in broken lines.
Figure 2:
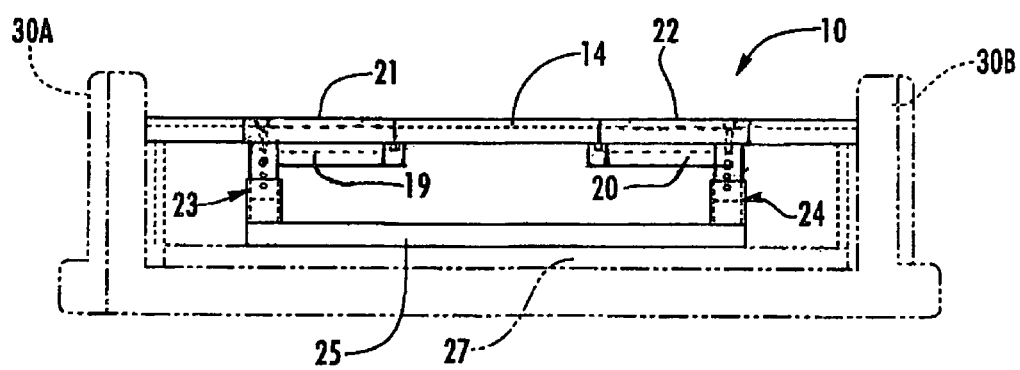
FIG. 2 is a front elevational view on lines 2-2 of FIG. 1.
Figure 3:
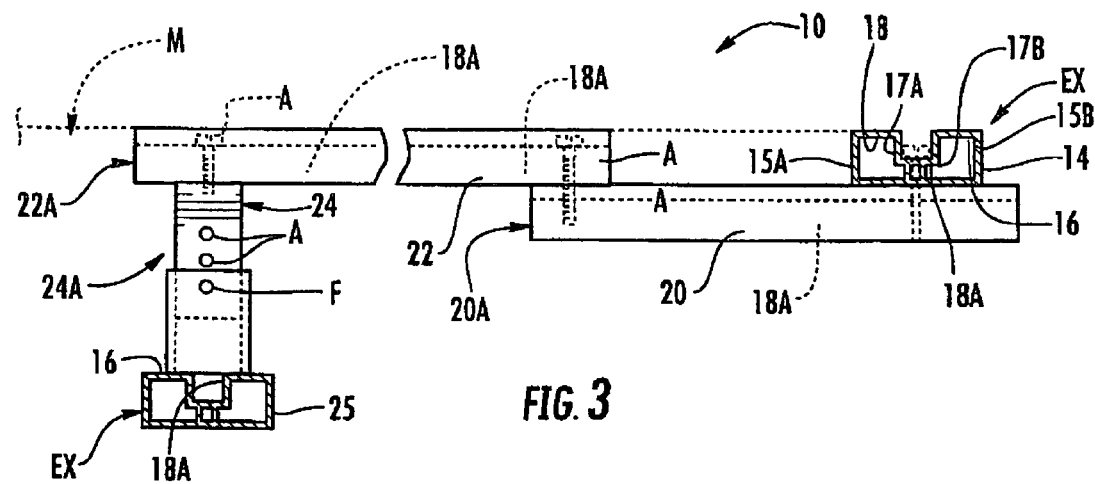
FIG. 3 is an enlarged side elevational and partial sectional view of the material support extension of the invention.

Referring to FIGS. 1-3 of the drawings, a pick-up truck cargo bed material support insert 10 of the invention can be seen positioned in a cargo bed 11 shown in broken lines. The material support insert 10 comprises an adjustable support fixture portion 12 and a cross support beam portion 13.

The adjustable support fixture portion 12 has a main cross material support beam 14 formed preferably of a custom metal extrusion EX, best seen in cross section in FIG. 3 of the drawings. The custom metal extrusion has spaced parallel sidewalls 15A and 15B, an interconnecting base 16 with a pair of centrally positioned upstanding internal spaced parallel support vertical partitions 17A and 17B. A top wall 18 has a central elongated recess channel 18A formed therein.

The main cross material support beam 14 has a pair of longitudinally spaced arms 19 and 20 pivotally secured thereto against it base wall 16 inwardly of its respective ends 14A and 14B as best seen in FIG. 1 of the drawings. The arms 19 and 20 in turn have a secondary set of material engagement arms 21 and 22 pivotally secured to the arms 19 and 20's free ends 19A and 20A as seen in FIG. 3 of the drawings. Each of the secondary material support arms 21 and 22 are pivotally secured to vertically descending post elements 23 and 24 at their respective free ends 21A and 22A.

The post elements 23 and 24 may be telescopically adjustable by a corresponding interengagement base post elements 23A and 24A with locking alignment apertures A and insertable fasteners F as will be well understood by those skilled in the art. The post vertical adjustability affords the use in different cargo beds to conform with height requirements imparted by different designs within the industry.

A tailgate engagement base beam 25 extends between and is secured to the free ends of respective post elements 23 and 24 as best seen in FIGS. 1 and 2 of the drawings. Given that all of the hereinbefore disclosed structural elements are preferably formed from the cross-sectional defined metal extrusion EX the multiple pivoted attachment points defined are achieved by simple nut and bolt interconnection fasteners extending through aligned apertures A in the base of the channel 18A between the upstanding internal spaced parallel support partitions 17A and 17B and through the base 16. It will be evident that by use of a single extrusion EX the relative manufacturing and fabrication costs can be contained.

The adjustable deployable foldable main support fixture portion 12 as hereinbefore described is positioned transversely across the cargo bed 11 rearwardly of the rear tire wells 26 adjacent the tailgate 27. The main across material support beam 14 is registerable within molded rail support recesses 29A and 29B in the cargo bed sidewalls 30A and 30B defined in this preferred embodiment by a molded cargo bed liner 31. It will be apparent that auxiliary mounting brackets may be provided in applications where a bed liner is not present according to different truck manufacturer configurations.

The cross support beam portion 13 is also preferably formed from the cross-sectional extrusion EX and is positioned transversely across the cargo bed 11 in front of the wheel wells 26 as best seen in FIGS. 1, 6 and 7 of the drawings.

As so installed and in use, the support fixture portion 12 can be deployed once the tailgate 27 has been lowered by pulling the tailgate engagement base beam 25 outwardly unfolding the respective interlinking arm linkage assemblies 19 and 21 and 20 and 22 as illustrated. The arm linkage pivoted orientation is such that secondary support arms 21 and 22 upper surface are in planar alignment with the main support beam 14 so as deployed they provide along with an upper surface 13A of the cross support 13 a planar engagement surface for cargo material M to be transported as seen graphically in broken lines in FIG. 7 of the drawings.

Figure 4:
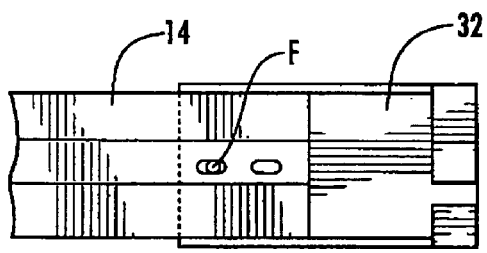
FIG. 4 is an enlarged partial top plan view of an adjustable rail configuration.
Figure 5:
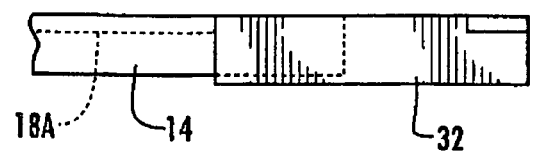
FIG. 5 is a side elevational view thereof.

Referring now to FIGS. 4 and 5 of the drawings, an adjustable beam extension end fitting 32 can be seen having a beam receiving channel 32A that will allow longitudinal length adjustability of the respective support beams 13 and 14 to accommodate different application insert cargo bed venues by slidably receiving the ends of the support beams 13 and 14 therewithin and secured by fastener F.

In FIGS. 8 and 9 of the drawings an end adapter beam fitting 33 is shown that provides an auxiliary mounting deployment in which support beam rest BR molded in bed liners or bracketed configurations, not shown, are configured to be wider than the defined extrusion EX which are telescopically insertable therein and held by multiple fasteners if so required.

It will thus be seen that a panel rack for pick-up trucks has been illustrated and described that addresses the issues of mid-size vehicles which typically have less than four feet between the respective wheel wells and therefore have difficulty carrying sheets goods such as plywood and wall board. Additionally, the center of gravity is generally too close to the rear support causing the load to teeter back and forth when the vehicle is driven. By utilization of the panel material support fixture 12 for pick-up trucks of the invention which is positioned behind or rearward of the rear wheel wells in a pick-up truck can be provided for extended exterior use beyond and out onto the lower tailgate for additional support of sheet goods. As noted previously when not in use material support fixture 12 will collapse so that the tailgate 27 may be closed and correspondingly the respective linkage configurations will not exceed the planar vertical surface of the main support cross beams as hereinbefore defined.

It will thus be seen that a new and novel configuration for a panel material rack transport for pick-up truck cargo beds has been illustrated and described and it will be apparent to those skilled in the art that various changes and modifications may be made thereto without departing from the spirit of the invention. Therefore I claim:

The invention claimed is:

1. A cargo material support for a cargo bed of a pick-up truck comprises,
    an adjustable material support fixture, a separate non-integral and independent cross bed-support beam,
    said adjustable material support fixture having a main cross-support beam extending transversely across said cargo bed, first and second longitudinally spaced pivot arms pivotally secured at their respective ends to and below said cross support beam inwardly of the respective ends of said cross support beam,
    a pair of material support arms pivotally secured to respective free ends of said first and second pivot arms in co-planar relation to said main cross-support beam defining a horizontal material support surface there between,
    vertically adjustable posts pivotally extending at right angles from the ends of said respective material support arms for axial post rotation, and a horizontally disposed base beam secured in fixed relation between the oppositely disposed ends said respective posts in parallel vertical spaced relation to said main cross-support beam.

2. The cargo material support set forth in claim 1 wherein said vertical adjustable posts comprises,
    base post elements extending in fixed relation from said base beam,
    telescopically extensible posts positioned in said base post elements pivotally secured to said respective material support arms and means for interlocking said base fixed post elements and telescopically engageable posts to one another in incremental vertical orientation.

3. The cargo material support set forth in claim 1 wherein said main and independent cross bed-support beams, said pivot arms, said material support arms and said interconnecting base beam comprises, a compound shape material extrusion having a transversely centered elongated recess channel therewithin.

4. The cargo material support set forth in claim 2 wherein said means for interlocking said base post elements and said telescopically engageable posts to one another in vertical incremental orientation comprises,
    a plurality of longitudinally spaced apertures in said post elements in selective aligned orientation to one another, fasteners secured through said respective aligned apertures in said corresponding post elements.

5. The cargo material support set forth in claim 3 wherein said compound shaped metal extrusion is formed of aluminum.

* * * * *